United States Patent [19]

Hayakawa et al.

[11] Patent Number: 5,627,147
[45] Date of Patent: *May 6, 1997

[54] LUBRICATING FLUID COMPOSITION FOR DYNAMIC PRESSURE BEARING

[75] Inventors: Masamichi Hayakawa; Toshihiro Kobayashi, both of Shimosuwa-machi; Kazuya Shimizu, Fujisawa; Yuusuke Matsumura, Tokyo; Masuhiro Onoyama, Isehara; Katsumi Nagano, Chita, all of Japan

[73] Assignees: Sankyo Seiki Mfg. Co., Ltd., Nagano; Taiho Industries Co., Ltd., Tokyo, both of Japan

[*] Notice: The term of this patent shall not extend beyond the expiration date of Pat. No. 5,629,274.

[21] Appl. No.: 622,249

[22] Filed: Mar. 25, 1996

[30] Foreign Application Priority Data

Mar. 25, 1995 [JP] Japan .................... 7-091549

[51] Int. Cl.$^6$ ............................................. C10M 141/02
[52] U.S. Cl. ................... 508/501; 252/62.52; 252/62.54

[58] Field of Search ............ 252/12.2, 26, 62.52, 252/62.54; 508/501

[56] References Cited

U.S. PATENT DOCUMENTS

| | | | |
|---|---|---|---|
| 3,834,775 | 9/1974 | Taffias et al. | 308/36.3 |
| 4,430,239 | 2/1984 | Wyman | 252/62.52 |
| 4,485,024 | 11/1984 | Furamura et al. | 252/62.51 |
| 4,624,797 | 11/1986 | Wakayama et al. | 252/62.52 |
| 4,626,370 | 12/1986 | Wakayama et al. | 252/62.52 |
| 5,382,374 | 1/1995 | Takemitsu et al. | 252/565 |
| 5,391,312 | 2/1995 | Cushpananda et al. | 252/565 |
| 5,403,098 | 4/1995 | Yasui et al. | 384/115 |

*Primary Examiner*—Jacqueline V. Howard
*Attorney, Agent, or Firm*—Oblon, Spivak, McClelland, Maier & Neustadt, P.C.

[57] ABSTRACT

A lubricating fluid composition for dynamic pressure bearings which supports the shaft of the bearing by dynamic pressure, wherein the lubricating fluid composition comprises fine magnetic particles dispersed in a base oil solvent which comprises a hydrogenated poly-α-olefin (PAO) and a polyol ester.

13 Claims, No Drawings

LUBRICATING FLUID COMPOSITION FOR DYNAMIC PRESSURE BEARING

BACKGROUND OF THE INVENTION

1. Field of the Invention

The present invention relates to a lubricating fluid composition for a dynamic pressure bearing which is used as the lubricating fluid of a dynamic pressure bearing which supports a shaft by dynamic pressure, and to the magnetic characteristics of which are utilized for sealing action.

2. Description of the Background

In recent years, attention has been directed to the bearing component of such devices as motors which drive various rotating members such as polygon mirrors, magnetic discs, optical discs, and the like at high speed. Attention has been directed to the use of a magnetic lubricating fluid as a lubricating fluid for the dynamic pressure bearing.

A magnetic fluid is a colloidal solution in which fine ferromagnetic particles are stably dispersed in a liquid solvent. In view of the strong ferromagnetic property which the liquid itself shows, the fluid is usually used as a sealant in combination with ball bearings in many cases. However, dynamic pressure bearings, which use the magnetic fluid as a lubricating fluid of the bearing, have great prospects, because the dynamic pressure bearing is superior in high speed rotation stability and stillness and the like in comparison to ball bearings. Dynamic pressure bearings provided with a magnetic fluid have been proposed. For example, Japanese Laid-Open Patent Application No. 88223/1985 discloses a device having a fluid which acts as both a lubricating fluid, for generating dynamic pressure, and a magnetic fluid for magnetic sealing.

A magnetic fluid composition has been used in the past for sealing purposes because of its most important property which is that of high sealing at pressures of about $10^{-6}$ Torr under high speed rotation conditions. However, a magnetic fluid composition which simultaneously satisfies both functions as a lubricating fluid and a sealing magnetic fluid (low abrasion characteristics and good lifetime characteristics of low volatility and high temperature resistance) has not yet been developed (see PETROTECH, vol. 13, No. 12 (1989)).

However, in such a device as mentioned above, the magnetic fluid composition must have both a low volatility as a seal and low viscosity to lower bearing loss. That is, the bearing portion of a device is exposed to far greater shearing forces and higher temperatures than the sealing portion, of a bearing device. Sometimes, active metal surfaces are formed by metal-metal contact and wear in the bearing, particularly caused at starting or stopping of a bearing containing device, with which the fluid comes into contact.

There is therefore a need for a lubricating fluid composition for dynamic pressure bearings which achieves not only high sealing properties, but also high lubricity and long lifetime characteristics.

As a result of research into the characteristics which a lubricating fluid composition should possess for use as both a lubricating fluid for dynamic pressure generation and a magnetic fluid for sealing, it has been found that it is necessary for the fluid to have:

(1) a low viscosity of 100 CP or less (at 27° C.), (2) a saturation magnetization of 50 gauss or more, (3) low volatility which can maintain sealing characteristics, (4) high temperature gelation resistance and oxidation resistance and the like and which exhibits stability in suppressing these effects, and (5) restraint of the activity of metal caused by contact or wear. However, a magnetic fluid satisfying these characteristics has not yet been developed. Above all, as mentioned in (4) above, the phenomenon of so-called gelation, in which fluidity is lost, which is likely to be generated particularly at high temperatures is a serious problem which needs to be solved in order to improve the lifetime characteristics of a magnetic lubricant fluid.

SUMMARY OF THE INVENTION

Accordingly, one object of the present invention is to provide a magnetic fluid of improved and stable low viscosity, low volatility, gel formation resistance and oxidation resistant properties, and which restrains the formation of active metal surfaces which result from metal—metal contact in bearings.

Briefly, this object and other objects of the present invention, as hereinafter will become more readily apparent can be attained by a lubricating fluid composition for dynamic pressure bearings which comprises a fluid in which fine magnetic particles are dispersed in a base oil solvent, wherein the base oil solvent comprises a mixture of a hydrogenated poly-α-olefin and a polyol ester oil.

In another aspect of the invention an anti-gelling agent, a viscosity temperature index improving agent and a metal inactivating agent can be added to the fluid, thereby improving viscosity, high temperature gelation resistance and the like properties of the fluid.

DESCRIPTION OF THE PREFERRED EMBODIMENTS

The lubricating fluid composition according to the present invention exhibits improved physical properties such as viscosity, volatility, high temperature gelation resistance and the like, by using a base oil solvent containing a hydrogenated poly-α-olefin and a polyol ester. Therefore, good characteristics can be obtained by a simple structure so that realization and improvement in reliability of a device where single fluid can be used as a lubricating fluid for dynamic pressure generation and a fluid for magnetic sealing can be accomplished.

The hydrogenated poly-α-olefin can be obtained by hydrogenating a polymerized material obtained by polymerizing 1-decene, isobutylene, or the like with a Lewis acid, or other acid. Poly-α-olefin having a number average molecular weight of about 200 to 1600 can be employed, but preferred are those, in view of volatility, and the like considerations, which have a number average molecular weight of about 400. Hydrogenation may not be carried out completely but, when the degree of the hydrogenation is low, the resulting material is likely to deteriorate.

The polyol ester has a structure, for example, in which a polyvalent alcohol, such as neopentyl glycol (NPG), trimethylolpropane (TMP), pentaerythritol (PE), or the like and a long chain or branched aliphatic acid having a carbon number of 5 to 18, are esterified. Preferred are various trimethylolpropane-mixed esters of the formula: $CH_3CH_2-C-(CH_2OOCR)_3$ in which R represents a $C_{5-10}$ alkyl group. Particularly preferred is a mixed trimethylolpropane ester of valeric acid and heptanoic acid (produced by Shin-nittetsu Kagaku K.K.; tradename: HATCOL 2915, 2925, 2937, etc.) or a mixed ester oil of trimethylolpropane with decanoic acid or heptanoic acid (produced by Shin-nittetsu Kagaku K.K.; tradename: HATCOL 2938, etc.)

Also, in the present invention, an anti-gelling agent is preferably added to the base oil solvent.

Suitable anti-gelling agents include antioxidants. In this case, one or more antioxidants selected from the group consisting of phenolic antioxidants, aminic antioxidants, which act as a free radical chain reaction terminator, and sulfur containing antioxidants, which act as a peroxide decomposing agent, may be used in combination. The preferred antioxidants are the aminic and phenolic antioxidants, which preferably are used in combination. An amount to be formulated is preferably 1 to 10 parts by weight of the aminic antioxidant and 1 to 10 parts by weight of the phenolic antioxidant, based on 100 parts by weight of the base oil solvent in view of solubility in the base oil solvent. When a single antioxidant is used, preferably from 1 to 10 parts by weight of the aminic antioxidant is employed. The phenolic antioxidant is effective only when it is used in combination with others.

Suitable phenolic antioxidants include 2,6-di-t-butylphenol (tradename: Ethyl 701, Irganox L108, etc.), 4,4'-methylenebis(2,6-di-t-butylphenol) (tradename: Ethyl 702, Irganox L109, etc.), 2,6-di-t-butyl-4-ethylphenol (tradename: Ethyl 724, etc.) and 2,6-di-t-4-n-butylphenol (tradename: Ethyl 744, etc).

In view of volatility and compatibility with the base material, 4,4'-methylenebis(2,6-di-t-butylphenol) is preferred.

Suitable aminic antioxidants include alkyldiphenylamine (tradename: Irganox L01, L57, L06, etc.) and phenyl-α-naphthylamine (tradename: Irganox L05, etc.). In view of volatility and compatibility with the base material, alkyldiphenylamine is preferred.

Furthermore, in the present invention, when a viscosity temperature index improving agent is added to the above-mentioned base oil solvent characteristics can be further improved.

A suitable viscosity temperature index improving agent is a polymethacrylate having the formula:

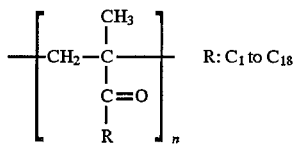    R: $C_1$ to $C_{18}$

The average molecular weight of the agent is 20,000 to 1,500,000, but in view of the relationship between the viscosity index improving effect and shear stability, those agents having an average molecular weight in the range of 20,000 to 50,000 such as Acrub 702, 707, and the like, produced by Sanyo Kasei K.K., are preferred. These polymers are difficult to handle in both production and formulation, so that they are generally diluted with a low viscosity mineral oil. However, the presence of a low viscosity mineral oil results in problems of volatility, dispersion stability, and the like, so that it is preferred to utilize a hydrogenated poly-α-olefin as a diluent.

Further, suitable viscosity temperature index improving agents include polybutenes (also polyisobutylene) having the formula infra. An example of such a viscosity improving agent is Tetrat, or the like, which is produced by Nippon Sekiyu Kagaku K.K.

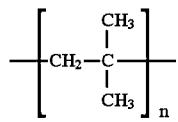

The average molecular weight of the above-identified material is 5,000 to 300,000, but those using a hydrogenated poly-α-olefin as a diluent are preferred for the same reasons mentioned above.

Moreover, in the present invention, characteristics of the fluid can be improved by adding a metal inactivating agent to the above-mentioned base oil solvent of the present invention.

As the metal inactivating agent, benzotriazole and a derivative thereof are representative materials but imidazoline and pyrimidine derivatives can also be used. Many of these materials, having a metal inactivating effect, are compounds which have an N—CN bond structure and have both the action of forming an inactive film on the surface of a metal and an antioxidant action. Other than these compounds, compounds having an N—C—S bonding structure can be used, but in view of solubility in the base solvent and volatility, and the like, benzotriazole derivatives such as Reomet 38, 29, SBT, etc. produced by Ciba Geigy AG are used.

In the present invention, the whole formulation ratio based on 100 parts by weight of the base oil solvent is preferably in the range of 30 to 90 parts by weight of the hydrogenated poly-α-olefin, 5 to 70 parts by weight of the polyol ester oil, 10 to 20 parts by weight of the antioxidant, 10 to 20 parts by weight of the metal inactivating agent and 25 to 35 parts by weight of the fine magnetic particles. Also the viscosity of the fluid is preferably 100 cp or less and the saturation magnetization is preferably 150 gauss or more. If the amount of the fine magnetic particles is less than 25 parts by weight, the saturation magnetization of the resulting material does not reach 150 gauss, while if the fine magnetic particles exceed 35 parts by weight, the viscosity is increased.

Having generally described this invention, a further understanding can be obtained by reference to certain specific examples which are provided herein for purposes of illustration only and are not intended to be limiting unless otherwise specified.

EXAMPLES

In the examples of the present invention, fine magnetic particles of Mn—Zn ferrite obtained by the coprecipitation method are used.

Preparation of the fine magnetic particles was carried out as follows. In 10 liters of water are dissolved 200 g of manganese chloride, 220 g of zinc chloride and 520 g of iron trichloride, and while maintaining the temperature of the solution at 95° C. with stirring, 6N sodium hydroxide is added dropwise to the solution until a pH of 11 is reached. A colloid of Mn—Zn ferrite is formed. Then, after adjusting the temperature of the liquid to 80° C., while further stirring the liquid, 2 liters of a 10% sodium oleate solution are added to the liquid. After cooling the liquid to room temperature, 3N hydrochloric acid is added until a pH of 6 is reached. Aggregated colloidal particles are washed sufficiently with water and dehydrated and dried thereby preparing fine Mn—Zn ferrite particles coated with oleic acid.

Then, 14.8 g of the fine Mn—Zn ferrite particles coated by oleic acid are taken from the above obtained product and 15 g of the base oil solvent described infra are added, and the mixture is stirred sufficiently to disperse the particles, and undispersed materials are then removed by ultrafiltration. Next, the base oil is added until the specific gravity of the liquid becomes 1.16 to obtain a fluid. The thus obtained fluid has a ferrite concentration of 35 wt. % and a saturation magnetization of 250 gauss.

Further, the base oil solvent for the dispersion of fine Mn—Zn ferrite magnetic particles, is a mixture of a hydrogenated poly-α-olefin [C30 to C40] (Shinflude 401, produced by Shin-nittestu Kagaku K.K.), a mixed trimethylolpropane ester valeric acid and heptanoic acid (HATCOL 2937, produced by Shin-nittestu Kgaku K.K.), diisodecyl adipate oil (HATCOL 2910, produced by Shin-nittestu Kagaku K.K.) and trioctyl trimellitate oil (HATCOL 2920, produced by Shin-nittestu Kagaku K.K.), to which an antioxidant (alkyldiphenylamine, Irganox L57, tradename), a viscosity index improving agent (OLICAT-M, produced by OSWALD BOLL CO.), and a metal inactivating agent (Reomet 39, produced by Ciba Geigy AG) are added.

By changing the ratio of each element in the base oil solvent as shown in Table 1, lubricating fluid compositions of Examples 1 to 5 and Comparative Examples 1 to 4 were prepared.

The obtained lubricating fluid compositions were each placed in a petri dish and the stabilities of the dispersed state of fine magnetic particles in each composition was evaluated by observing appearances of such as the presence or absence of precipitation, aggregation, separation, and the like. Further, each composition was allowed to stand at a temperature of 80° C. for 520 hours and the volatility weight loss was determined. Moreover, the gel time of each composition was measured at a temperature of 140° C. As for viscosity, the viscosity and viscosity temperature index at 25° C. were determined for each composition. The results are shown in Table 2.

TABLE 1

| Sample | Example 1 | Example 2 | Comparative Example 1 | Comparative Example 2 | Comparative Example 3 | Comparative Example 4 | Example 3 | Example 4 | (wt. %) Example 5 |
|---|---|---|---|---|---|---|---|---|---|
| Poly α olefin PA0401 | Bal | Bal | Bal | Bal | Bal | Bal | Bal | Bal | Bal |
| Polyol ester H2937 | 10 | 30 | 80 | — | — | — | 30 | 30 | 30 |
| Diester H2910 | — | — | — | — | 30 | — | — | — | — |
| Triester H2920 | — | — | — | — | — | 30 | — | — | — |
| Antioxidant L57 | 5 | 5 | 5 | 5 | 5 | 5 | 5 | 5 | — |
| Viscosity temperature index improving agent | 5 | 5 | 5 | 5 | 5 | 5 | — | — | — |
| Metal inactivating agent | 0.05 | 0.05 | 0.05 | 0.05 | 0.05 | 0.05 | — | — | — |

In Table 1, "Bal" indicates the remaining amount of ingredient (poly-α-olefin) necessary to complete a given formulation.

TABLE 2

| Sample/ Magnetic fluid characteristics | Example 1 | Example 2 | Comparative Example 1 | Comparative Example 2 | Comparative Example 3 | Comparative Example 4 | Example 3 | Example 4 | (wt. %) Example 5 |
|---|---|---|---|---|---|---|---|---|---|
| Dispersion stability | ○ | ○ | X | ○ | ○ | ○ | ○ | ○ | ○ |
| Viscosity cp at 25° C. | 66 | 72 | — | 60 | 58 | 212 | 72 | 67 | 65 |
| Volatility weight loss (wt. %) | 0.12 | 0.08 | — | 0.14 | 1.67 | 0.06 | 0.08 | 0.08 | 0.07 |
| Viscosity temperature index | 179 | 171 | — | 184 | 158 | 173 | 179 | 148 | 154 |
| High temperature gelation (lifetime) | 240 | 300 | — | 100 | 140 | 300 | 290 | 290 | 210 |

In Table 2, samples of each of Examples 1 and 2 are evaluated in terms of the characteristics of dispersion stability, viscosity, volatility loss, viscosity temperature index and high temperature gel time. These two examples exhibit preferred values, and particularly Example 2, in which the amount of the polyol ester is increased in the range of 70 wt. %, the high temperature gel time is very large and thus this particular embodiment exhibits excellent, high temperature stability.

For Comparative Example 1, on the other hand, in which the polyol ester was mixed to a level exceeding 70 wt. %, the dispersion of the fine magnetic particles was impossible. Also, in Comparative Example 2, in which the polyol ester was not mixed, the mixture could be dispersed, but the composition gelled within a short time at high temperature.

Further, in Comparative Examples 3 and 4, wherein other esters than the polyol ester were used, the viscosity characteristics and volatility characteristics were unacceptable.

In the sample of Example 3, in which the metal inactivating agent had been removed from Example 2, the characteristics obtained showed good values, but the high temperature gel time was slightly lowered and it was found that the high temperature gel time could be elongated by addition of the metal inactivating agent.

Also, in the sample of Example 4, in which the viscosity temperature index improving agent had been removed from the sample of Example 3, the characteristics obtained showed good values, but the viscosity characteristics were slightly lowered as a matter of course and it was found that the viscosity characteristics could be improved by addition of the viscosity temperature index improving agent.

Further, in the sample of Example 5, in which the antioxidant had been removed from the sample of Example 4, the characteristics obtained showed relatively good values, but the high temperature gel time was remarkably lowered and it was found that the high temperature gel time could be markedly lengthened by addition of the antioxidant.

As described above, the lubricating fluid composition of the present invention is explained by the Examples in detail. It should also be observed that in addition to Mn—Zn ferrite as the material for the fine magnetic particles, Ni—Zn ferrite or magnetite can be used in the same manner. Also, other any higher fatty acid can be employed as a surfactant. Moreover, as an anti-gelling agent, an aminic, phenolic or sulfur containing compound other than the above-mentioned antioxidant may be used in the same manner.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A lubricating fluid composition for dynamic pressure bearings which support the shaft of the bearing by dynamic pressure, comprising:

said lubricating fluid composition including fine magnetic particles dispersed in a base oil solvent which comprises a hydrogenated poly-α-olefin (PAO) and a polyol ester.

2. The lubricating fluid composition of claim 1, wherein an anti-gelling agent is added to said base oil solvent.

3. The lubricating fluid composition of claim 1, wherein said hydrogenated poly-α-olefin is obtained by hydrogenating a polymer obtained by polymerizing at least one of 1-decene or isobutylene with a Lewis acid.

4. The lubricating fluid composition of claim 1, wherein said polyol ester is prepared by esterifying a polyvalent alcohol selected from the group consisting of neopentyl glycol (NPG), trimethylolpropane (TMP) and pentaerythritol (PE) with a long chain or branched aliphatic acid having 5 to 18 carbon atoms.

5. The lubricating fluid composition of claim 1, wherein an amount of said polyol ester is in the range of less than 70%.

6. The lubricating fluid composition of claim 1, wherein a viscosity index improving agent is added to said base oil solvent in a predetermined amount.

7. The lubricating fluid composition of claim 5, wherein an anti-gelling agent is added to said base oil solvent.

8. The lubricating fluid composition of claim 2, wherein said anti-gelling agent is an antioxidant.

9. The lubricating fluid composition of claim 8, wherein said antioxidant is at least one member selected from the group consisting of phenolic, aminic and sulfur containing antioxidants.

10. The lubricating fluid composition of claim 5, wherein a viscosity index improving agent is added to said base oil solvent in a predetermined amount.

11. The lubricating fluid composition of claim 1, wherein a metal inactivating agent is added to said base oil solvent in a predetermined amount.

12. The lubricating fluid composition of claim 8, wherein a viscosity index improving agent is added to said base oil solvent in a predetermined amount.

13. The lubricating fluid composition of claim 12, wherein a metal inactivating agent is added to said base oil solvent in a predetermined amount.

* * * * *